United States Patent [19]

Rafn

[11] Patent Number: 5,474,242
[45] Date of Patent: Dec. 12, 1995

[54] DEMOLITION TOOLS WITH JAWS HAVING REPLACEABLE WORKING SURFACES

[75] Inventor: Mark D. Rafn, Two Harbors, Minn.

[73] Assignee: The Stanley Works, New Britain, Conn.

[21] Appl. No.: 321,150

[22] Filed: Oct. 11, 1994

[51] Int. Cl.$^6$ ................................. B02C 1/06; B02C 1/10
[52] U.S. Cl. .................... 241/101.71; 241/266; 241/300; 30/134
[58] Field of Search ................................. 241/101.7, 266, 241/300, 294; 30/134

[56]       References Cited

U.S. PATENT DOCUMENTS

| 4,198,747 | 4/1980 | LaBounty | 30/134 |
|---|---|---|---|
| 4,519,135 | 5/1985 | LaBounty | 30/134 |
| 4,543,719 | 10/1985 | Pardoe | 30/134 |
| 4,616,417 | 10/1986 | Gross | 30/134 |
| 4,776,093 | 10/1988 | Gross | 30/134 |
| 4,897,921 | 2/1990 | Ramun | 30/134 |
| 4,934,616 | 6/1990 | Zepf | 241/266 |
| 4,951,886 | 8/1990 | Berto | 241/101.7 |
| 5,060,378 | 10/1991 | LaBounty et al. | 30/134 |
| 5,183,216 | 2/1993 | Wack | 241/101.7 |
| 5,224,268 | 7/1993 | Pemberton | 30/134 |
| 5,230,151 | 7/1993 | Kunzman et al. | 30/134 |
| 5,292,079 | 3/1994 | Zakohji | 241/264 |
| 5,301,882 | 4/1994 | Morikawa et al. | 241/101.7 |
| 5,361,999 | 11/1994 | Sakato et al. | 241/101.7 |

Primary Examiner—John Husar

[57]            ABSTRACT

A replaceable blade assembly is used to secure tool blades to the jaws of a material handler and comprises a holder secured to the jaw and a blade insert which is releasably secured thereto. The holder has a face with an elongated intermediate portion, an inclined end portion adjacent its outer end, a channel extending along the elongated intermediate portion, and a recess in the inclined end portion. The blade insert has a first face for mounting against the face of the holder with an elongated intermediate portion bearing against the elongated intermediate portion of the holder. A inclined end portion adjacent the outer end of the blade insert bears against the inclined end portion of the holder, and a spine on the elongated portion seats in the channel of the holder. A projection on the outer end of the blade insert seats in the holder recess, and a fastener releasably secures the inner end of the insert to the inner end of the holder.

12 Claims, 4 Drawing Sheets

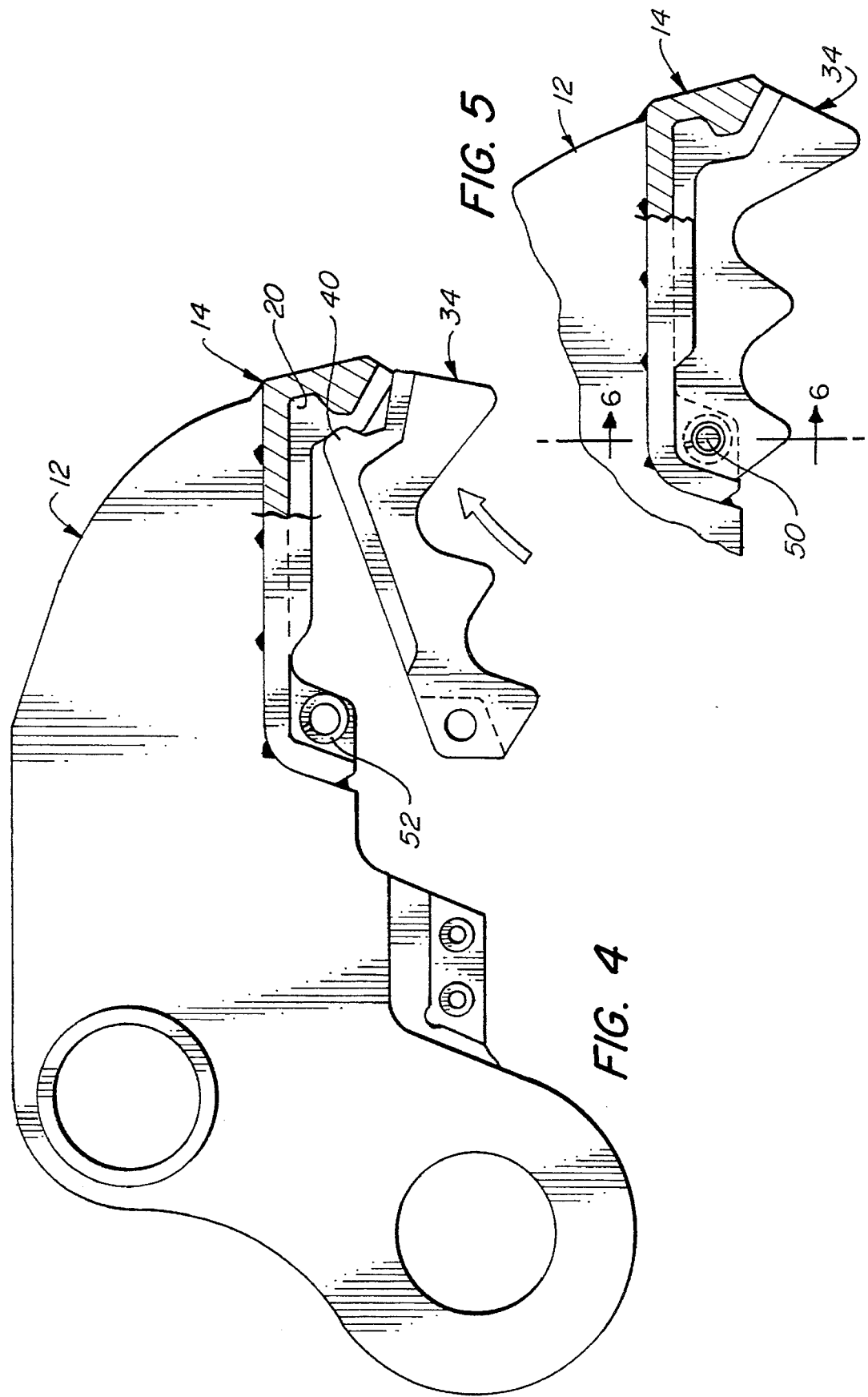

DEMOLITION TOOLS WITH JAWS HAVING REPLACEABLE WORKING SURFACES

BACKGROUND OF THE INVENTION

This invention relates to blades mounted in the jaws of a material handler such as grapples and like tools, and more particularly, to a blade mounting assembly which enables replacement of these blades.

Material handlers equipped with grapples and crushing jaws are usually employed in demolition applications such as handling and processing of materials, i.e., concrete wood and metal. The abrasive nature or hardness of some of these materials results in relatively rapid wear of the surfaces which engage the work. As a result, replaceable elements providing the wear surfaces are commonly utilized.

The term "blade" as used herein is intended to encompass various configurations for a work engaging surface including a cutting or shearing surface, a crushing surface, a gripping surface, etc.

Replaceable tool blades are preferably fabricated from hardened steel. The blades are generally connected directly to the jaws by conventional techniques such as bolting them. Illustrative of such assemblies are Pemberton U.S. Pat. No. 5,224,268, and Ramun U.S. Pat. No. 4,897,921.

Conventional methods of fastening have disadvantages such as requiring engaging multiple fasteners to secure the blades, and this is time consuming and sometimes difficult because of the inaccessibility of bolt locations. Generally, the blade is not fully supported against the forces which act upon it during use.

Moreover, the fasteners securing the insert are exposed to relatively high stresses during operation.

It is an object of the present invention to provide a novel blade assembly for mounting on the jaws of the grapples and like tools and enabling facile replacement of the blades.

It is also an object to provide such a blade assembly which is readily installed on the jaws of the material handler.

Another object is to provide such a blade assembly requiring a minimum number of fasteners to secure the replaceable blade.

A further object is to provide such a blade assembly which efficiently transfers loads and stresses from the blade to the jaw.

SUMMARY OF THE INVENTION

It has now been found that the foregoing and related objects can be readily attained in a replaceable blade assembly for securing tool blades to the jaws of a material handler having a pair of elongated jaws which are pivoted at their inner ends, and which have outer ends and opposed first faces. This assembly includes a holder having a first face adapted to be secured to the first face of the jaw of the material handler, a second face opposite from the first face, and first and second ends. The second face has (i) an elongated intermediate portion, (ii) an inclined end portion adjacent the first end and extending from the intermediate portion towards the first end, (iii) a channel extending along the elongated intermediate portion, and (iv) a recess in the first inclined end portion.

Mounted against the second face of the holder is a blade insert having a first face for engaging workpieces, a second face opposite the first face and first and second ends. The second face has (i) an elongated intermediate portion bearing against the elongated intermediate portion of the holder, (ii) an inclined end portion adjacent the first end and extending from the elongated intermediate portion towards the first end and bearing against the inclined end portion of the holder, (iii) a spine projecting from and extending along the elongated portion thereof and seated in the channel of the holder, and (iv) a projection adjacent the first end seated in the holder recess; and means releasably securing the second end of the insert to the second end of the holder.

Preferably, the second end of the insert abuts against a shoulder on the holder adjacent its second end, and the channel is disposed intermediate the width of the holder to provide load bearing surfaces along the sides of the channel. The spine is disposed intermediate the width of the insert to provide shoulders along the sides of the spine to bear against the load bearing surfaces of the holder.

Generally, the channel continues along the inclined end portion of the holder, and the spine continues along the inclined end portion of the blade insert and seats in the channel thereof. The recess in the first inclined end portion of the holder is a deeper section of the channel, and the projection adjacent the first end of the blade insert is on the spine.

Desirably, the releasable securing means includes a projection on one of the holder and the blade insert, and a recess on the other of the holder and the blade insert seating the projection. The projection of the releasable securing means is a boss, and the recess of the releasable securing means is a bifurcated portion seating the boss. The boss and the bifurcated portion have aligned apertures therein in which is seated a fastener. Preferably, the boss is on the holder and the bifurcated portion is on the blade insert.

BRIEF DESCRIPTION OF THE DRAWINGS

FIG. 4 is a side elevational view of a blade insert being assembled into the holder;

FIG. 5 is a side elevational view in partial section of the assembled blade insert and holder; and FIG. 6 is a sectional view along the line 6—6 of FIG. 5 drawn to a greatly enlarged scale.

DETAILED DESCRIPTION OF THE ILLUSTRATED EMBODIMENT

Figure 1:
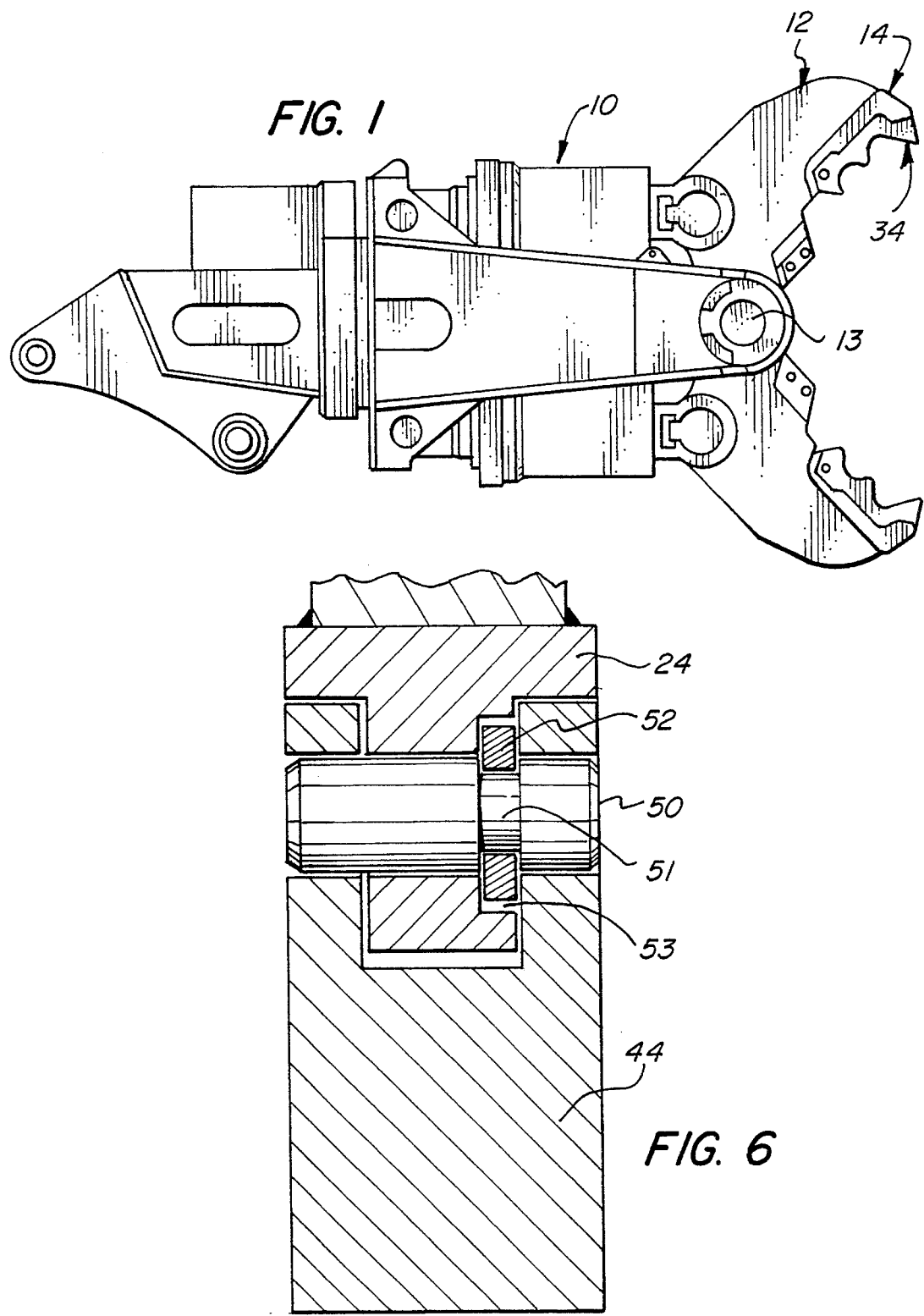
FIG. 1 is a side elevational view of hydraulically actuatable material handler with jaws incorporating the blade assembly of the present invention.

Turning first to FIG. 1, therein illustrated is a material handler or demolition tool, generally designated by the numeral 10, having a pair of elongated jaws generally designated by the numeral 12 and which are pivoted at their inner ends on pivots 13. The jaws have opposed faces upon which are mounted replaceable blade assemblies embodying the present invention and each including a holder generally designated by the numeral 14, and a blade insert generally designated by the numeral 34. The holder 14 is preferably welded to the jaw 12, and the insert 34 is releasably secured in the holder 14.

Figure 2:
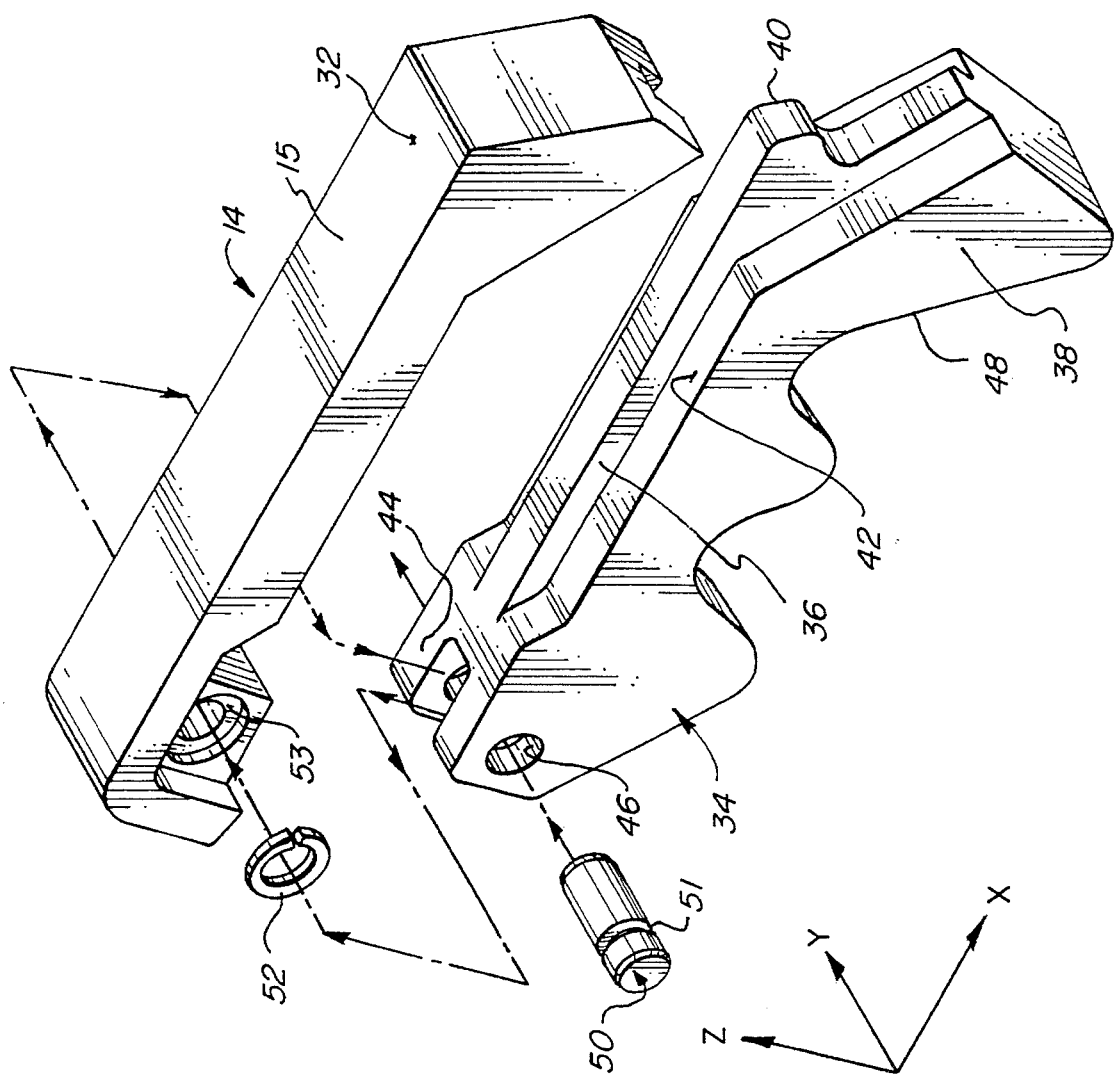
FIG. 2 is an exploded view of the blade assembly.
Figure 3:
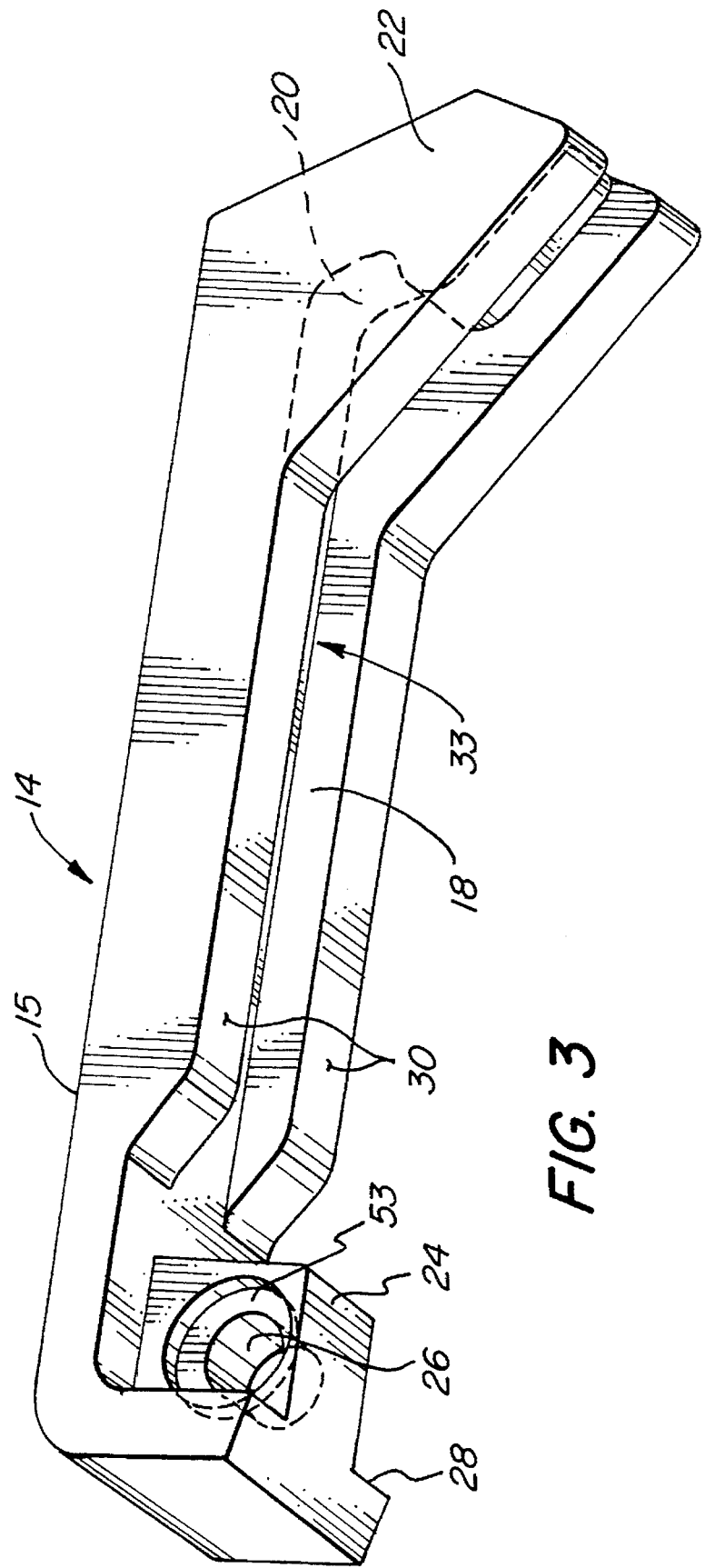
FIG. 3 is a perspective view of the holder of the blade assembly.

Turning in detail to the holder 14 as seen in FIGS. 2 and 3, it has an elongated body 15 with a generally planar surface 32 which is welded to the face of the jaw 12. The opposite or outer face 33 of the holder 14 includes a longitudinally extending channel 18 intermediate the width of the holder 14 and an inclined outer end portion 22 into which the channel 18 extends. In the inclined outer end portion 22 is a recess 20 which is provided by a deepened section of the channel 18. Load bearing surfaces 30 extend along the sides of the channel 18. The inner end portion 22 of the holder 14 has inwardly facing generally vertically oriented shoulders 28 on opposite sides of the boss 24 which has an aperture 26 extending transversely thereof.

Turning next to the blade insert 34, this is best illustrated in FIG. 2 of the appended drawings and is elongated with an inner face 35 which seats against the face 35 of the holder 14. The insert 34 has a bifurcated inner end portion 44 with an aperture 46 extending therethrough and an inclined outer end portion 38. Intermediate the width of the insert 34 is a spine 36 which is seated in channel 18 of the holder 14 and constrains translation of the insert 34 in the Y axis as seen in FIG. 2. Shoulders 42 extend along the sides of the spine 36 and bear against the load bearing surfaces 30 of the holder 14 to transfer stresses in the Z axis to the jaws 12. The spine 36 and shoulders 42 continue along the length of the inclined outer end portion 38 of the insert 34 and transfer stresses to the inclined outer end portion 22 of the holder 14 to constrain translational movement of the insert 34 in the X axis.

The spine 36 on insert 34 has a projection or nose 40 along the outer end portion 38 which seats in the recess 20 of the holder 14 to constrain rotational movement of the insert 34 about the Y axis and translational movement of insert 34 in the X axis. The projection 40 also provides support for the insert 34 during the mounting of the insert 34 in the holder 14 as will be discussed more fully hereinafter.

As best seen in FIG. 6, the bifurcated portion 44 of the insert seats about the boss 24 of the holder 14 and abuts the shoulders 28 of the holder 14. The bifurcated portion 44 constrains rotational movement of the insert 34 about the Y axis and the translational movement of the insert 34 in the X axis. The mounting pin 50 seats in the apertures 46 of the bifurcated end portion 44 and aperture 26 of the boss 24 and is retained therein by the split ring 52 which seats in a groove 51 in the pin 50 and in the recess 53 in the surface of the boss 26. The pin 50 constrains rotation of the insert 34 about the Y axis and translation in the X axis.

The opposite surface 48 of the insert 34 engages the workpieces and is configured appropriately for the application. The work engaging surface 48 may be of any suitable configuration as this is unrelated to the operation of the present invention of mounting the blade insert 34 to the holder 14. As best seen in FIG. 1, the jaws 12 of the material handler 10 pivot at their inner ends, thereby urging their outer ends together during material handling operations. In practice, material is handled, crushed or cut between the work engaging surfaces 48 of a pair of blade inserts 34.

The manner of assembling the insert 34 in the holder 14 is best seen in FIGS. 4 and 5. The projection 40 of the insert 34 is inserted into the recess 20 of the holder 14 as indicated by the arrow in FIG. 4. The inner end of the insert 34 is then pivoted into its mounted position abutting the holder 14 with the bifurcated end portion 44 disposed about the boss 24. The projection 40 supports the end portion 38 of insert 34 while the pin 50 is seated in apertures 26 and 46 as shown in FIG. 5.

Once assembled, the various cooperating elements and surfaces of the holder 14 and the insert 34 act in concert to secure the insert 34 firmly to the holder 14.

The various elements of the holder 14 and the insert 34 act in concert to transfer loads from the insert 34 to the holder 14. The insert shoulders 42 bear against the holder surfaces 30 to transfer loads encountered when crushing, cutting or otherwise handling material. The transfer of loads or stresses and the resistance to movement in the several axes has been described hereinbefore. Stresses are also transferred from insert 34 to holder 14 at the junction of bifurcated portion 44 and boss 24.

The configuration of several components may vary from that which is illustrated in the accompanying drawings. For example, the boss 24 may be on the insert 34 rather than on the holder 14, and the bifurcated portion 44 may be on the holder 14 rather than on the insert 34. As an alternate to the pin 50 and split ring 52, the fastening may be effected by a variety of fasteners such as a nut and a bolt.

Although various metals may be employed for the construction of the components of the releasable blade assembly, preferably at least the work engaging surface 48 is made of hardened steel for maximum resistance to abrasion and long life. The holder 14 is also conveniently fabricated from hardened steel to provide maximum dimensional stability for mating with the surfaces of the insert 34.

It will be appreciated that the jaws of the material handler may be configured in the fashion of the holder of the present assembly. However, this would require greater cost and precision than presently required for such jaws. Moreover, damage to the holder portion could not be so readily remedied as by cutting off the holder portion and replacing it.

Thus, it can be seen from the foregoing detailed description and the attached drawings that the replaceable blade assembly of the present invention fully supports the blade insert against forces which act upon it during use. The projection on the blade insert and the recess in the holder are configured to permit facile insertion of the blade insert into the holder and rugged assembly. Moreover, the blade assembly employs a single fastener, thereby making assembly relatively facile and rapid as compared with conventional blade assemblies requiring multiple fasteners.

Having thus described the invention, what is claimed is:

1. A replaceable blade assembly for securing tool blades to an associated material handler having a pair of elongated jaws which are pivoted at their inner ends, and which have outer ends and opposed first faces, said assembly comprising:

(a) a holder having a first face adapted to be secured to the first face of the jaw of an associated material handler, a second face opposite from said first face, and first and second ends, said second face having
      (i) an elongated intermediate portion,
      (ii) an inclined end portion adjacent said first end and extending from said intermediate portion towards said first end,
      (iii) a channel extending along said elongated intermediate portion, and
      (iv) a recess in said first inclined end portion;
   (b) a blade insert having a first face for engaging workpieces and a second face opposite said first face mounted against said second face of said holder, said blade insert having first and second ends, said second face having
      (i) an elongated intermediate portion bearing against said elongated intermediate portion of said holder,
      (ii) an inclined end portion adjacent said first end and extending from said elongated intermediate portion towards said first end and bearing against said inclined end portion of said holder, (iii) a spine projecting from and extending along said elongated portion thereof, said spine being seated in said channel of said holder, and (iv) a projection adjacent said first end seated in said holder recess; and (c) means releasably securing said second end of said insert to said second end of said holder.

2. A replaceable blade assembly according to claim 1 wherein said second end of said insert abuts against a shoulder on said holder adjacent its second end.

3. A replaceable blade assembly according to claim 1 wherein said channel is disposed intermediate said width of said holder to provide load bearing surfaces along the sides of said channel, and said spine is disposed intermediate said width of said insert to provide shoulders along said sides of said spine to bear against said load bearing surfaces of said holder.

4. A replaceable blade assembly according to claim 1 wherein said channel continues along said inclined end portion of said holder, and said spine continues along said inclined end portion of said blade insert and seats in said channel thereof.

5. A replaceable blade assembly according to claim 4 wherein said recess in said first inclined end portion of said holder is a deeper section of said channel, and said projection adjacent said first end of said blade insert is on said spine.

6. A replaceable blade assembly according to claim 1 wherein said releasable securing means includes a projection on one of said holder and said blade insert, and a recess on the other of said holder and said blade insert seating said projection.

7. A replaceable blade assembly according to claim 6 wherein said projection of said releasable securing means is a boss, and said recess of said releasable securing means is a bifurcated portion seating said boss, and said boss and said bifurcated portion have aligned apertures therein seating a fastener.

8. A replaceable blade assembly according to claim 7 wherein said boss is on said holder and said bifurcated portion is on said blade insert.

9. A replaceable blade assembly for securing tool blades to the jaws of an associated material handler having a pair of elongated jaws which are pivoted at their inner ends, and which have outer ends and opposed first faces, said assembly comprising:

(a) a holder having a first face adapted to be secured to the first face of the jaw of an associated material handler, a second face opposite from said first face, and first and second ends, said second face having (i) an elongated intermediate portion, (ii) an inclined end portion adjacent said first end and extending from said intermediate portion towards said first end, (iii) a channel extending along said elongated intermediate portion, said channel disposed intermediate the width of said holder to provide load bearing surfaces along said sides of said channel, said channel continuing along said inclined end portion, and (iv) a recess in said first inclined end portion, said recess being a deeper section of said channel;

(b) a blade insert having a first face for engaging workpieces and a second face opposite said first face mounted against said second face of said holder, said blade insert having first and second ends, said second end abutting against a shoulder on said holder adjacent its second end, said second face having (i) an elongated intermediate portion bearing against said elongated intermediate portion of said holder, (ii) an inclined end portion adjacent said first end and extending from said elongated intermediate portion towards said first end and bearing against said inclined end portion of said holder, (iii) a spine projecting from and extending along said elongated portion thereof, said spine being seated in said channel of said holder, said spine disposed intermediate the width of said insert to provide shoulders along said sides of said spine to bear against said load bearing surfaces of said holder, said spine continuing along said inclined end portion and seating in said channel thereof, and (iv) a projection adjacent said first end, seated in said holder recess and on said spine; and (d) means releasably securing said second end of said insert to said second end of said holder.

10. A replaceable blade assembly according to claim 9 wherein said releasable securing means includes a projection on one of said holder and said blade insert, and a recess on the other of said holder and said blade insert seating said projection.

11. A replaceable blade assembly according to claim 10 wherein said projection of said releasable securing means is a boss, said recess of said releasable securing means is a bifurcated portion seating said boss, and said boss and said bifurcated portion have aligned apertures therein seating a fastener.

12. A replaceable blade assembly according to claim 11 wherein said boss is on said holder and said bifurcated portion is on said blade insert.

* * * * *